(No Model.) 2 Sheets—Sheet 1.
F. J. ROLLER.
ARITHMETICAL CARD.
No. 565,797. Patented Aug. 11, 1896.
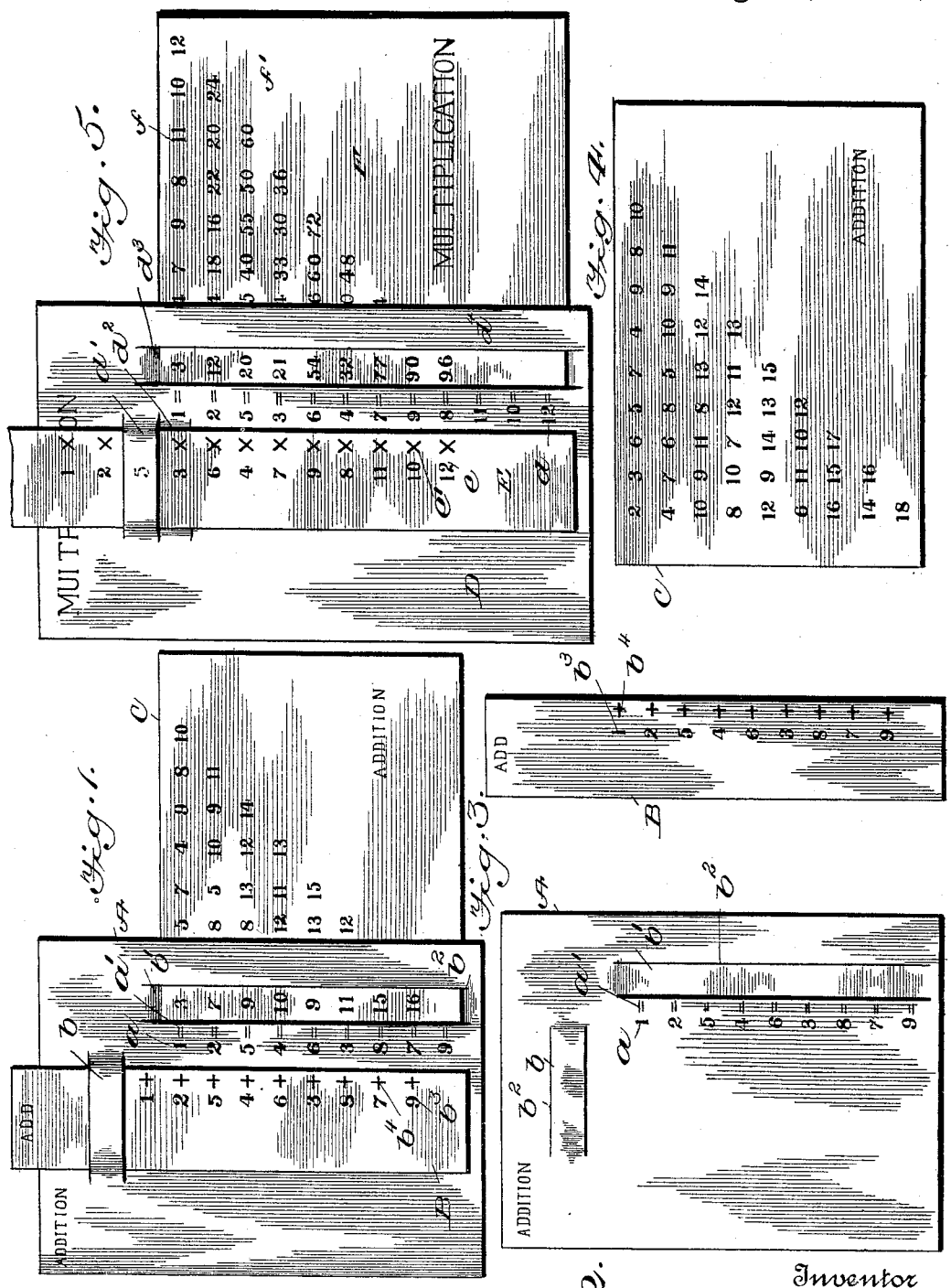

(No Model.)  F. J. ROLLER.  2 Sheets—Sheet 2.
ARITHMETICAL CARD.
No. 565,797.  Patented Aug. 11, 1896.
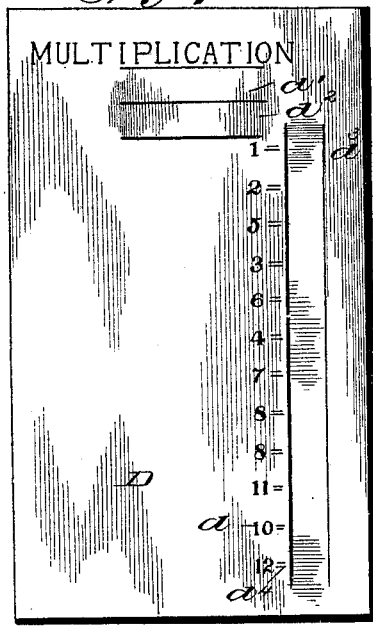
Fig. 7.
Fig. 9.
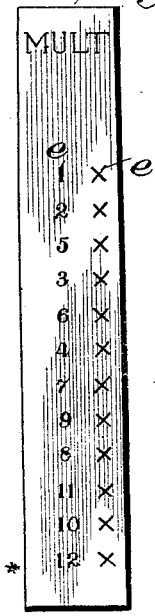
Fig. 8.
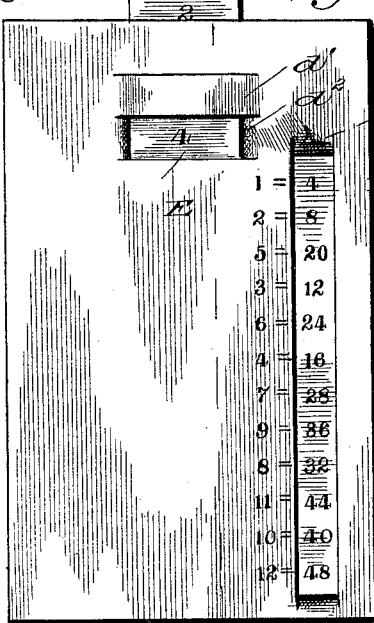
Fig. 6.
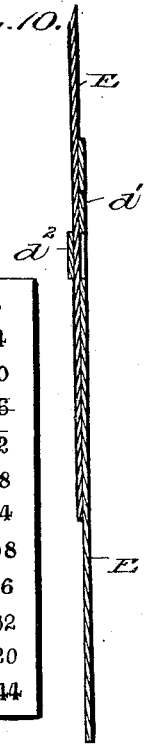
Fig. 10.
Witnesses  Inventor
  Frank J. Roller
  Attorney

UNITED STATES PATENT OFFICE.

FRANK J. ROLLER, OF NILES, OHIO.

ARITHMETICAL CARD.

SPECIFICATION forming part of Letters Patent No. 565,797, dated August 11, 1896.

Application filed January 3, 1896. Serial No. 574,262. (No model.)

*To all whom it may concern:*

Be it known that I, FRANK J. ROLLER, of Niles, in the county of Trumbull and State of Ohio, have invented certain new and useful Improvements in Arithmetical Cards; and I do hereby declare the following to be a full, clear, and exact description of the invention, such as will enable others skilled in the art to which it appertains to make and use the same.

This invention contemplates certain new and useful improvements in arithmetical cards for the ready and effective teaching of addition and multiplication.

The object of the invention is to produce a series of cards for the purpose of teaching addition and multiplication tables, making use, in connection with the former, of the numerals "1" to "9," and on the multiplication-cards the numerals "1" to "12," inclusive, irregularly arranged. Each set comprises a series of three cards, two of them being so mounted on a third as to be capable of being moved to obtain different results in addition and multiplication, the numerals on one card indicating the answers produced by the union (addition or multiplication) of the numbers on the other cards in certain relation to each other.

The invention will be hereinafter fully set forth, and particularly pointed out in the claims.

In the accompanying drawings, Figure 1 is a view of the series of cards united as used in addition. Figs. 2, 3, and 4 illustrate the said cards separated. Figs. 5 and 6 are views of a series used in multiplication. Figs. 7, 8, and 9 show the same disconnected. Fig. 10 is a sectional view on the line $x\ x$, Fig. 6.

Referring to the drawings, and particularly Figs. 1 to 4, inclusive, A designates a card on which are printed in a vertical column $a$ the numbers "1" to "9," with the sign of equality $a'$ placed after each number. $b\ b'$ represent two straps on the card, the former being parallel with the ends of the card at right angles to the column of numbers, and the latter, $b'$, parallel with the sides and also with said column. The straps are formed by slits $b^2$ cut in the card. A card B is of sufficient width to be inserted under the strap $b$, and on said card is a vertical column of numbers $b^3$, from "1" to "9," inclusive, with the plus-sign $b^4$ arranged after each number. This card is designed to be moved longitudinally over the card A beneath the strap $b$. A card C, Fig. 4, has printed thereon the various sums of the forty-five two-letter combinations capable of being formed with the numbers "1" to "9." This card is inserted back of the card A over the strap $b'$, so that its vertical column of numbers, one column at a time, are visible in the opening over the strap $b'$, said numbers being in line with the numbers on card A.

To use these cards for addition, the card B is inserted beneath strap $b$ so that its column of numbers shall lie just to the left of the column shown on card A, and the card C is inserted back of card A over strap $b'$. The first column of numbers on card C gives the totals of the adjacent numbers on the cards A and B added together. Next, move the card B up so that the second number of its column will be in line with the first number of the column on card A, and move card C to the left so as to place the second column thereof beneath the longitudinal opening formed by the depressed strap $b'$. The numerals of this second column on the card C will be the sum total of the adjacent numbers of the cards A and B. In this way the addition is carried on until the last or bottom number of the column on card B is in line with the first or top number of the column on card A, the sum of which will be in the last column of card C.

Referring to Figs. 5 to 10, inclusive, being the multiplication-cards, D designates a card similar to card A, and having a vertical column $d$ of numbers from "1" to "12," inclusive, irregularly arranged, the opening formed with two upper straps $d'\ d^2$ and a longitudinal or side strap $d^3$. Opposite each number of column $d$ is the equlization-mark $d^4$. A card E, similar to card B, is provided with a column of numbers $e$, from "1" to "12," inclusive, and after each number is the multiplication-sign $e'$. This card, in teaching the tables, is designed to be moved upwardly back of card D, over strap $d^2$, so as to expose its numbers one at a time over the opening formed by the depression of said strap. A third card F, like card C, is designed to be passed back of card A, over strap $d^3$, so that any of its columns of numbers $f$ will appear at the longitudinal opening formed by said strap. The arrangement of numbers in columns on one side $f'$ of this card is designed to teach the multiplication-tables, each number of the card E being used as a multiplier of the entire column of card D, that is, the number of card E exposed over the strap $d^2$ will, when multiplied by each of the numbers of card D, or vice versa, give the answer indicated by the opposite number of the corresponding column of card F. On the opposite side $f^2$ of this card the arrangement of numbers is designed for use in drilling or examination as to the multiplication-table without repeating in the question any of the figures from "1" to "12," inclusive, and without repeating any question upon any particular table, and by an arrangement which will make it impossible for the learner to determine the next answer by any system of easy addition. Hence drilling the learner can be easily accomplished. In the first column of this side of card F will appear the answers to the twelve questions asked upon cards D and E, the card E being located on the card D and passed beneath strap $d'$. The card E is moved the extent of one or more numerals so as to place one of its numerals in line with the first numeral of the column of card D, and the card F is moved accordingly, that is, the columns of card F must, as to its order, correspond with the order of the numerals of card E. For instance, if the third numeral of card E is on line with the top numeral of card D the third column of card F must appear at the opening formed by the depression of strap $d^3$. Thus the answers to the several questions will be given by the card F. Card E is pushed to the top and card F to the left until all questions upon the multiplication-tables will be asked once, and only once, and none omitted, thus making in all seventy-eight questions and answers.

The advantages of my invention are apparent. It will be seen that by means of the series of cards comprising each set addition and multiplication can be easily and thoroughly taught, and it will be specially observed that on the multiplication-cards the arrangement of numbers is such as to prevent the learner from answering questions in their order by any quick system of addition, and that by the reverse side of one of the cards a thorough examination can be easily conducted.

I claim as my invention—

1. Arithmetical cards consisting of three cards or members, two of which are adjustable on the third, two of said cards having single columns of numbers and the remaining card having a plurality of columns of numbers, all arranged as and for the purpose set forth.

2. Arithmetical cards consisting of a card having a single column of numbers, a second card also having a single column of numbers and designed to be moved over said former card on a line parallel with said column of numbers thereon, and a third card having a plurality of columns of numbers and designed to be moved along said first-mentioned card at right angles to the columns of numbers thereon, as set forth.

3. Arithmetical cards consisting of a card having a single column of numbers and an opening parallel with said column, a second card also having a single column of numbers and designed to be moved over said former card on a line parallel with the said column of numbers thereon, and a third card having a plurality of columns of numbers and designed to be moved beneath said first-mentioned column so that each of its said columns of numbers will appear, one at a time, beneath said opening, substantially as set forth.

4. Arithmetical cards consisting of a card having straps or loops and a column of numbers, and two additional cards held by said straps or loops, one of said cards having a single column of numbers designed to coincide with said former column of numbers, and the other of said cards having a plurality of columns of numbers, as and for the purpose set forth.

5. Arithmetical cards consisting of a card having a column of numbers, an upper opening at right angles thereto, and a longitudinal opening parallel with said columns of numbers, a second card designed to be moved beneath said upper opening and having a column of numbers, and a third card having a series of columns of numbers and designed to be moved beneath said longitudinal opening, substantially as set forth.

F. J. ROLLER.

Witnesses:
JAMES C. MACE,
CHARLEY H. ARTMAN.